United States Patent
Sasaki et al.

(10) Patent No.: US 8,662,903 B2
(45) Date of Patent: Mar. 4, 2014

(54) ELECTRICAL COMPONENT STRUCTURE

(75) Inventors: Kensuke Sasaki, Sagamihara (JP); Kenta Suzuki, Zama (JP); Yasuhiro Kinbara, Yokohama (JP); Tadashi Kasuya, Atsugi (JP); Masaki Nakano, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 193 days.

(21) Appl. No.: 13/266,048

(22) PCT Filed: Jun. 24, 2010

(86) PCT No.: PCT/IB2010/001525
§ 371 (c)(1),
(2), (4) Date: Oct. 24, 2011

(87) PCT Pub. No.: WO2011/001243
PCT Pub. Date: Jan. 6, 2011

(65) Prior Publication Data
US 2012/0045907 A1    Feb. 23, 2012

(30) Foreign Application Priority Data
Jun. 30, 2009    (JP) .................................. 2009-155427

(51) Int. Cl.
*H01R 11/30*    (2006.01)
(52) U.S. Cl.
USPC .......................................................... 439/38
(58) Field of Classification Search
USPC .............................................. 439/38, 39, 374
See application file for complete search history.

(56) References Cited

U.S. PATENT DOCUMENTS

| | | | | | |
|---|---|---|---|---|---|
| 1,895,643 | A | * | 1/1933 | Putnam | 324/716 |
| 2,021,111 | A | * | 11/1935 | Weat | 362/198 |
| 2,076,136 | A | * | 4/1937 | Weed | 335/261 |
| 3,200,320 | A | * | 8/1965 | Mallory | 320/115 |
| 3,229,030 | A | * | 1/1966 | Baermann | 174/117 F |
| 3,387,606 | A | * | 6/1968 | Crafts et al. | 128/202.27 |
| 3,742,408 | A | * | 6/1973 | Jaeger | 336/5 |
| 4,110,669 | A | * | 8/1978 | Akamatsu | 318/700 |
| 4,118,090 | A | * | 10/1978 | Del Mei | 439/39 |

(Continued)

FOREIGN PATENT DOCUMENTS

| | | |
|---|---|---|
| CN | 1890763 A | 1/2007 |
| JP | 7-336932 A | 12/1995 |

(Continued)

OTHER PUBLICATIONS

A Written Opinion of the International Search Authority for International Application No. PCT/IB2010/001525, dated Sep. 8, 2010, mailed Oct. 26, 2010.

(Continued)

*Primary Examiner* — Amy Cohen Johnson
*Assistant Examiner* — Vladimir Imas
(74) *Attorney, Agent, or Firm* — Global IP Counselors, LLP (57) ABSTRACT

An electric component structure is provided with at least two electrical conductive parts, an insulator and a magnetic flux generating structure. The electrical conductive parts are arranged with an electric line of force existing between adjacent ones of the conductive parts. The insulator holds the conductive parts. The magnetic flux generating structure generates a magnetic flux with magnetic flux lines oriented in a direction different from a direction of the electric line of force existing between the adjacent ones of the conductive parts.

18 Claims, 6 Drawing Sheets

(56) References Cited

U.S. PATENT DOCUMENTS

| | | | |
|---|---|---|---|
| 4,445,732 A * | 5/1984 | Wafer | 439/38 |
| 4,451,113 A * | 5/1984 | Zuniga | 439/40 |
| 5,921,783 A * | 7/1999 | Fritsch et al. | 439/38 |
| 6,030,229 A * | 2/2000 | Tsutsui | 439/39 |
| 6,283,766 B1 * | 9/2001 | Donnelly et al. | 439/38 |
| 6,350,076 B1 * | 2/2002 | Wagner et al. | 403/135 |
| 6,398,335 B1 * | 6/2002 | Benjamin | 347/19 |
| 6,409,517 B2 * | 6/2002 | Malnati | 439/38 |
| 7,230,399 B2 * | 6/2007 | Kuribayashi et al. | 318/434 |
| 7,645,143 B2 * | 1/2010 | Rohrbach et al. | 439/39 |
| 7,997,906 B2 * | 8/2011 | Ligtenberg et al. | 439/38 |
| 8,272,876 B2 * | 9/2012 | Schultz | 439/38 |
| 8,435,042 B2 * | 5/2013 | Rohrbach et al. | 439/39 |
| 2006/0148285 A1 | 7/2006 | Naoi | |

FOREIGN PATENT DOCUMENTS

| | | |
|---|---|---|
| JP | 2000-134851 A | 5/2000 |
| JP | 2001-200988 A | 7/2001 |
| JP | 2005-80388 A | 3/2005 |
| JP | 2008-17693 A | 1/2008 |
| WO | 2005/056734 A2 | 6/2005 |

OTHER PUBLICATIONS

An English translation of the Chinese Written Notification of Opinion Upon the First Examination of corresponding Chinese Application No. 201080029615.7, issued on Jun. 28, 2013.

* cited by examiner

ELECTRICAL COMPONENT STRUCTURE

CROSS-REFERENCE TO RELATED APPLICATIONS

This application is a U.S. National stage of International Application No. PCT/IB2010/001525, filed Jun. 24, 2010, which claims priority to Japanese Patent Application No. 2009-155427, filed on Jun. 30, 2009. The entire disclosure of Japanese Patent Application No. 2009-155427 is hereby incorporated herein by reference.

BACKGROUND

1. Field of the Invention

The present invention generally relates to an electrical component structure. More specifically, the present invention relates to an electrical component structure having an excellent insulating performance.

2. Background Information

Technology has been proposed that uses magnets to improve the ability of an oil filter to remove metal particles from a cooling oil or lubricating oil. For example, such technology has been proposed in Japanese Laid-Open Patent Publication No. 2001-200988. In this publication, the magnets are used to increase the ability of the oil filter to collect metal particles contained in the oil as the oil passes through the oil filter.

SUMMARY

It has been discovered with a conventional structure, such as the one mentioned above, using magnets to collect metal particles, only metal particles passing nearby the magnets are collected. This often results in most of the metal particles not be collected. Also when oil containing metal particles circulates around conductive parts (e.g., exposed terminals), the metal particles can cause short circuits between the conductive parts, and thus degrade the insulating performance of the oil.

In view of the state of the known technology, one aspect of the present disclosure is to provide an electrical component structure that can prevent a short circuit caused by metal particles from occurring between terminals of an electrical component and improve an insulating capacity of the electrical component.

In order to achieve the aforementioned object, an electrical component according to the one aspect is provided that mainly comprises at least two electrical conductive parts, an insulator and a magnetic flux generating structure. The electrical conductive parts are arranged with an electric line of force existing between adjacent ones of the conductive parts. The insulator holds the conductive parts. The magnetic flux generating structure generates a magnetic flux with magnetic flux lines oriented in a direction different from a direction of the electric line of force existing between the adjacent ones of the conductive parts.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
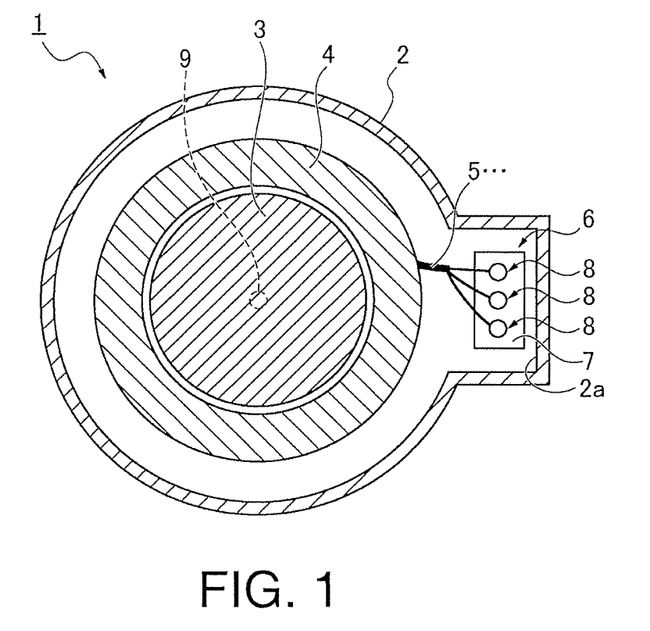
FIG. 1 is a cross sectional view of a motor as seen along a section that is perpendicular to a rotary shaft of the motor, with the motor incorporating an electrical component structure in accordance with illustrated embodiments.

Referring initially to FIG. 1, a motor 1 is illustrated in cross section. The motor 1 is one example of an electrical device with an electrical component structure in accordance with illustrated embodiments, discussed below. The motor 1 mainly includes a generally cylindrical motor case 2, a rotor member 3 and a stator member 4. The rotor member 3 and the stator member 4 are enclosed inside the motor case 2. The motor 1 has windings 5 that are wound onto the stator member 4 for providing three phases (phases U, V, and W). The windings 5 extend from the stator member 4 to a connection section 6. The motor case 2 includes a protruding portion 2a for accommodating the connection section 6. A terminal block 7 is arranged inside a protruding portion 2a of the motor case 2. The terminal block 7 serves as an insulator of the connection section 6. The windings 5 are connected to separate metal terminals 8 (exemplifying conductive parts) that are provided on the terminal block 7. The connection section 6 of FIG. 2 generically represents the connection sections (FIGS. 3 to 11) that utilizes at least one magnetic flux generating structure (FIGS. 3 to 11) to prevent a short circuit from occurring between the metal terminals Band to improve the insulating performance of the terminal block 7 between the metal terminals 8.

Figure 2:
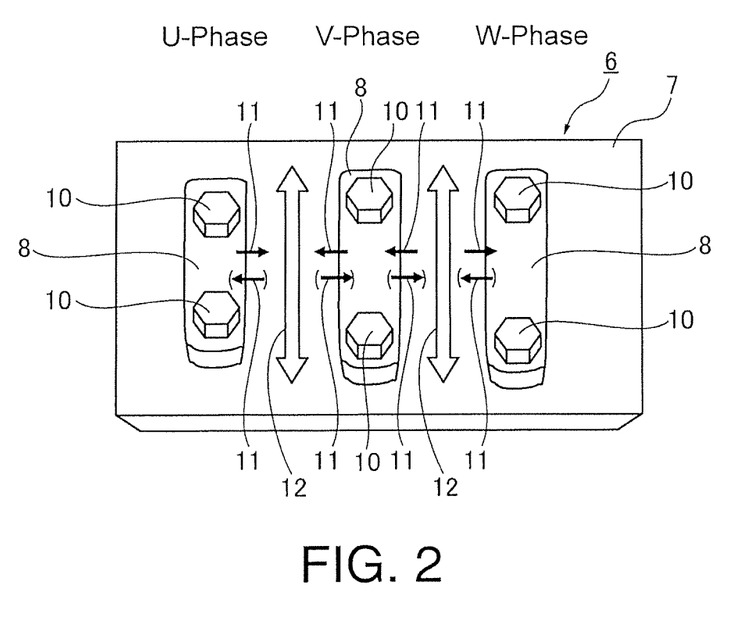
FIG. 2 is an enlarged, simplified top view of the an electrical component structure of the motor, with an electrical component structure including a connection section with a terminal block and three terminals.

As shown in FIG. 2, the metal terminals 8 are arranged on the terminal block 7 such that the long sides of the metal terminals 8 are substantially parallel to one another. The metal terminals 8 are further arranged on the terminal block 7 such that the metal terminals 8 are separated by equal intervals or substantially equal intervals. Each of the metal terminals 8 is fastened in place with a pair of fastening members 10.

As shown in FIG. 1, a rotary shaft 9 is provided in a radially center portion of the rotor member 3 of the motor 1. The rotary shaft 9 is rotatably supported on bearings (not shown) that are disposed between the motor case 2 and the rotary shaft 9. The bearings enable the rotor member 3 to rotate smoothly together with the rotary shaft 9 by reducing rotary friction. It is known that, during rotation, the metal of the bearings wears and metal particles are produced. These metal particles can adhere to a surface of the terminal block 7.

In the illustrated embodiment of FIG. 2, the metal particles produced from the wear of the bearings intend to adhere to a surface of the terminal block 7 such that they become arranged in a linear form corresponding to an electric line of force 11 existing between adjacent ones of the metal terminals 8 within an electric field existing between the metal terminals 8. More specifically, in the illustrated embodiment, the electric line of force 11 runs from one terminal 8 to the other terminal 8. The electric line of force 11 is shown by the arrows extending between the adjacent ones of the metal terminals 8. The arrows shown in parentheses indicate a current flow direction of the electric lines of force 11 that would occur if the electric current flow is in the opposite direction. In any event, the metal particles produced from the wear of the bearings become aligned so as to be parallel to the electric line of force 11 existing between the adjacent ones of the metal terminals 8 within an electric field existing between the metal terminals 8.

In this motor 1 of FIG. 1, the magnetic flux generating structure is provided, as explained in detail in FIGS. 3 to 11, such that a magnetic flux is generated with magnetic field or flux lines 12 that are oriented in a direction different from a direction of the electric line of force 11 existing between the adjacent ones of the metal terminals 8. In FIG. 2, the magnetic flux lines 12 are provided between the adjacent ones of the metal terminals 8, with the magnetic flux lines 12 being represented by unfilled arrows. As indicated in FIG. 2, the magnetic flux lines 12 are oriented so as to intersect with the electric lines of force 11 existing between the metal terminals 8. The magnetic field of the magnetic flux serves to cancel out the electric lines of force 11. Thus, in the motor 1 according to this illustrated embodiment, since the magnetic forces of the magnetic flux lines 12 are oriented in a direction different from the direction of the electric lines of force 11 between the adjacent ones of the metal terminals 8, the electric lines of force 11 between adjacent metal terminals 8 are cancelled out.

Consequently, metal particles existing between the metal terminals 8 are obstructed from becoming aligned with the electric lines of force 11. As a result, the metal particles are obstructed from forming a path joining adjacent metal terminals 8 and short circuits do not readily occur between the metal terminals 8.

The magnetic forces of the magnetic flux lines 12 act on the metal particles between the metal terminals 8 in a direction different from, i.e., approximately perpendicular to, a direction in which the electric lines of force 11 are oriented. Thus, the magnetic forces impede the ability of the metal particles to align with the electric lines of force 11 between the metal terminals 8. As a result, a short circuit is prevented from occurring between the metal terminals 8 and the insulating performance of the terminal block 7 between the metal terminals 8 can be improved.

Additionally, in this disclosure, the expression "in a direction different from a direction in which the electric lines of force 11 are oriented" means that the magnetic forces of the magnetic flux lines 12 can exert a sufficient effect against the metal particles even if they are not oriented exactly perpendicularly with respect to the direction of the lines of force 11. A sufficient effect can be obtained so long as the direction of the magnetic flux lines 12 is approximately perpendicular or intersects at a prescribed angle (e.g., 80 degrees). In other words, the phrase "approximately perpendicular" refers to an angle (e.g., 80 degrees) that is sufficient to cancel the electric lines of force 11 between the adjacent ones the metal terminals 8 to prevent a short circuit from occurring due to metal particles aligning to form a connection between adjacent ones the metal terminals 8. Thus, the magnetic force does not need to be perfectly perpendicular the electric line of force 11.

Figure 3:
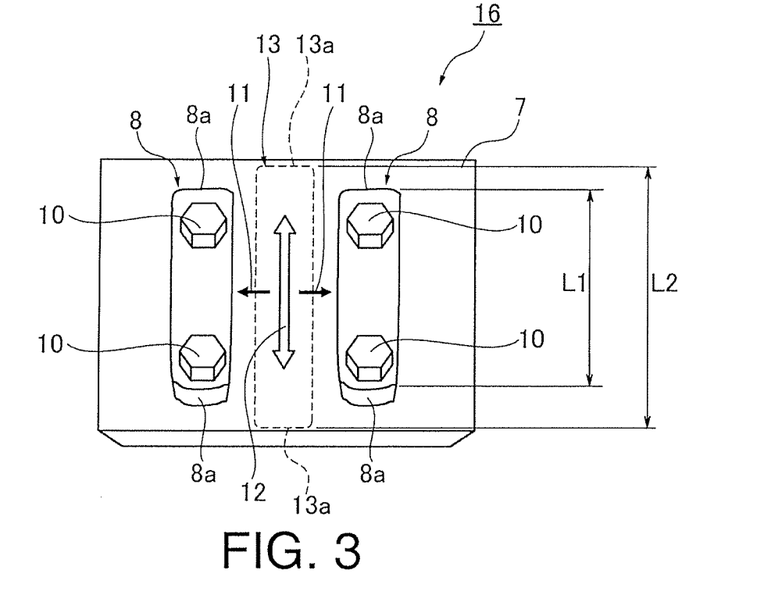
FIG. 3 is an enlarged, simplified top view of two of the terminals of the electrical component structure illustrated in FIGS. 1 and 2, with the electrical component structure being configured in accordance with a first embodiment.

FIG. 3 is an enlarged, simplified top view of a connection section 16 that represents two terminals of the connection section 6 illustrated in FIGS. 1 and 2 to explain details of an electrical component structure in accordance with a first embodiment. Parts that are identical or equivalent to parts of the connection section 6 will be indicated with the same reference numerals in the connection section 16.

In the motor 1 according to the first embodiment, the connection section 16 includes the terminal block 7 and the metal terminals 8 (only two shown). The terminal block 7 is made of an insulating material. The metal terminals 8 are fastened to the terminal block 7 with the fastening members 10. The terminal block 7 serves as an insulator, while the metal terminals 8 serve as the conductive parts. The metal terminals 8 (only two shown) are arranged to be substantially parallel to each other such that the metal terminals 8 are separated by substantially equal intervals. A magnetized insulating member 13 is located between adjacent ones of the metal terminals 8. The magnetized insulating member 13 constitutes of an example a magnetic flux generating structure of this embodiment. The magnetized insulating member 13 can be disposed either in a recess formed in the terminal block 7, or one of the surfaces of the terminal block 7. The insulating material of the terminal block 7 can be mold around part of magnetized insulating member 13 or completely around the magnetized insulating member 13 as need and/or desired.

As shown in FIG. 3, the insulating member 13 of the first embodiment is configured to have a rectangular shape. Likewise, the metal terminals 8 have rectangular shapes with a length dimension L1. A length dimension L2 of the insulating member 13 is longer than the length dimension L1 of the metal terminals 8. The insulating member 13 is arranged to be parallel to the metal terminals 8.

The insulating member 13 is pre-magnetized to generate a magnetic flux 12 between the metal terminals 8 as indicated by the unfilled arrow in FIG. 3. The magnetic flux lines 12 are oriented to intersect with an electric line of force 11 existing between the metal terminals 8. Thus, due to the insulating member 13, the connection section 16 is constructed such that the magnetic flux lines 12 are generated between the metal terminals 8 with the magnetic flux lines 12 being oriented to intersect with the electric line of force 11 existing between the metal terminals 8.

Operational effects of an electrical component structure according to the first embodiment will now be explained.

The metal terminals 8 are typically high power conductive parts and metal particles can end up on a surface between the metal terminals 8 by simply landing there or being carried there by a lubricating oil. Once there, the metal particles are drawn toward a static electric force of an electric field generated by the electric line of force 11. Thus, there is a possibility that the metal particles will move and become arranged along a path corresponding to the electric line of force 11.

If the static electric force of the electric field causes metal particles gather to such a degree that a continuous path of metal particles capable of conducting a current is formed between the metal terminals 8 or to such a degree that the particles are close enough together for electrical discharging to occur when a discharge threshold voltage is exceeded, then a short circuit could occur between the metal terminals 8. In order to prevent such a short circuit, the metal particles are prevented from becoming arranged in accordance with the electric field by generating a magnetic flux that intersects the electric line of force between the terminals.

With the electrical component structure according to the first embodiment, an external force is exerted against the metal particles in a direction substantially perpendicular to the electric line of force 11, thereby preventing the metal particles from aligning with the electric line of force 11. More specifically, the magnetized insulating member 13 generates a magnetic flux with the magnetic flux lines 12 oriented in a direction intersecting with the electric line of force 11, as indicated with the unfilled arrow in FIG. 3. The magnetic flux produces a magnetic force serving as the aforementioned external force.

Metal particles that adhered to a surface of the terminal block 7 between the metal terminals 8 due to simply landing there or being carried there by a lubricating oil are subjected not only to a force oriented in the direction of the electric line of force 11, but also to a magnetic force that is caused by the magnetic flux with the magnetic flux lines 12 oriented in a direction substantially perpendicular to the electric line of force 11. Consequently, in the motor 1 according to the first embodiment, the metal particles do not become arranged in a linear form substantially parallel to the electric line of force 11 spanning between the metal terminals 8. Instead, the metal particles are obstructed from aligning with the electric line of force 11 by the magnetic flux (the magnetic flux lines 12 being oriented which are oriented in a direction intersecting with the electric line of force 11) and a short circuit is prevented from occurring between the metal terminals 8. As a result, the insulating performance can be improved between the metal terminals 8 and the operational reliability of the motor 1 can be increased.

As shown in FIG. 3, in the first embodiment, the insulating member 13 is embedded between the metal terminals 8 and configured such that the length dimension L2 of the insulating member 13 is longer than the length dimension L1 of the metal terminals 8 and both longitudinal end portions 13a of the insulating member 13 protrude beyond both longitudinal ends of the metal terminals 8 in a lengthwise direction. Consequently, the magnetic flux lines 12 exerts a magnetic force on metal particles adhered to a surface of the terminal block 7 can be reliably generated without changing an insulating material serving as a main substance from which the terminal block 7 is made. Thus, the manufacturing cost can be reduced in comparison with a design that requires changing all of the insulating material serving as the main substance from which the terminal block 7 is made.

Figure 4:
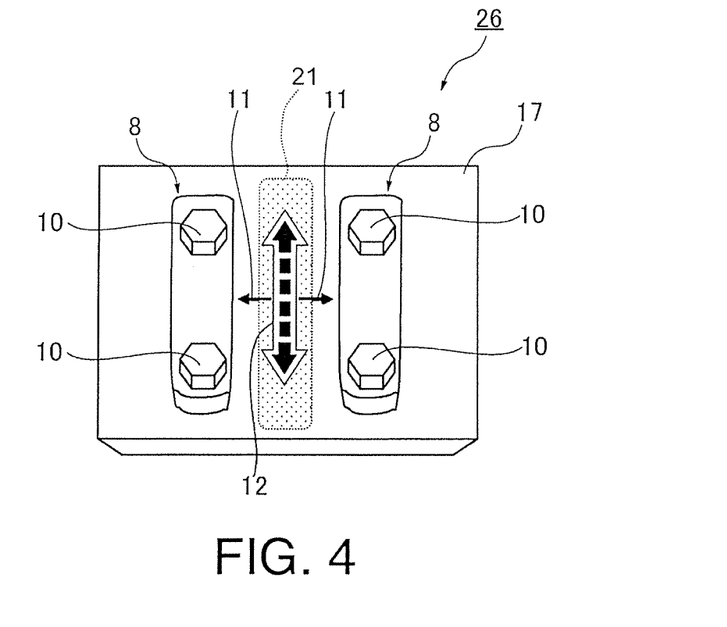
FIG. 4 is an enlarged, simplified top view of two of the terminals of the electrical component structure illustrated in FIGS. 1 and 2, with the electrical component structure being configured in accordance with a second embodiment.

FIG. 4 is an enlarged, simplified top view of a connection section 26 in accordance with a second embodiment, which can be incorporated in the motor 1 of FIG. 1. In other words, the connection section 26 represents two terminals of the connection section 6 illustrated in FIGS. 1 and 2, when the connection section 26 is incorporated in the motor 1 of FIG. 1. FIG. 2 will be used to explain details of the electrical component structure in accordance with the second embodiment. Parts that are identical or equivalent to parts of the previously described connection sections will be indicated with the same reference numerals in the connection section 26.

In the second embodiment, the connection section 26 includes a terminal block 17 and the metal terminals 8 (only two shown). The terminal block 17 is made of an insulating material. The metal terminals 8 are fastened to the terminal block 17 with the fastening members 10. The terminal block 17 serves as an insulator, while the metal terminals 8 serve as the conductive parts. The metal terminals 8 (only two shown) are arranged to be substantially parallel to each other such that the metal terminals 8 are separated by substantially equal intervals. A magnetic body 21 is formed in the terminal block 17 between adjacent ones of the metal terminals 8. The magnetic body 21 is formed of a plurality of magnetic particles that are mixed into the insulating material of the terminal block 17 in advance when forming (e.g., molding) the terminal block 17. In other words, the magnetic particles forming the magnetic body 21 are disposed within the insulating material of the terminal block 17 at areas of between adjacent ones of the metal terminals 8 during the forming process of the terminal block 17. The magnetic body 21 constitutes an example of a magnetic flux generating structure of this embodiment. The magnetic body 21 generates a magnetic flux with magnetic flux lines 12 oriented in a lengthwise direction of the metal terminals 8, as indicated with the arrow in FIG. 4. Thus, in the second embodiment, the connection section 26 is constructed such that the magnetic flux is generated between the metal terminals 8 with the magnetic flux lines 12 being oriented to perpendicularly intersect with the electric line of force 11 existing between the metal terminals 8.

Operational effects of an electrical component structure according to the second embodiment will now be explained. The second embodiment achieves the same operational effects as the previously explained embodiment and the first embodiment. Additionally, in the second embodiment, residual metal particles existing between the metal terminals 8 are dispersed by the magnetic flux lines 12 being oriented in a direction substantially perpendicular to the electric line of force 11 that exists between the metal terminals 8 (the magnetic flux lines 12 are indicated with an unfilled arrow and the electric line of force 11 is indicated with small arrows in FIG. 4). As a result, the metal particles are not pulled into alignment by an electric field generated by the electric line of force 11.

As a result, a short circuit is prevented from occurring between the metal terminals 8, the insulating performance between the metal terminals 8 can be improved, and the operational reliability of the motor 1 can be increased.

Furthermore, with the terminal block 17 according to the second embodiment, the magnetic body 21 is mixed into the insulating material of the terminal block 17 in advance. The magnetic body 21 makes it easy to generate a magnetic flux with the magnetic flux lines 12 being oriented in a lengthwise direction of the metal terminals 8, as indicated with the arrow in FIG. 4. Since the magnetic particles of the magnetic body 21 are mix into the insulating material in advance, it is not necessary to provide magnetic bodies separately such that the manufacturing cost can be prevented from increasing due to an increased number of parts.

The magnetic body 21 also makes it easy to generate a magnetic flux with the magnetic flux lines 12 being oriented in a lengthwise direction of the metal terminals 8, as indicated with the arrow in FIG. 4, even if the distance between the metal terminals 8 is small. Thus, the overall size of the terminal block 17 does not need to be increased to add the magnetic body 21 between each of the adjacent ones of the metal terminals 8.

Explanations of other constituent features and operational effects are omitted for brevity because they are identical or equivalent to constituent features and operational effects of the previously explained first embodiment.

Figure 5:
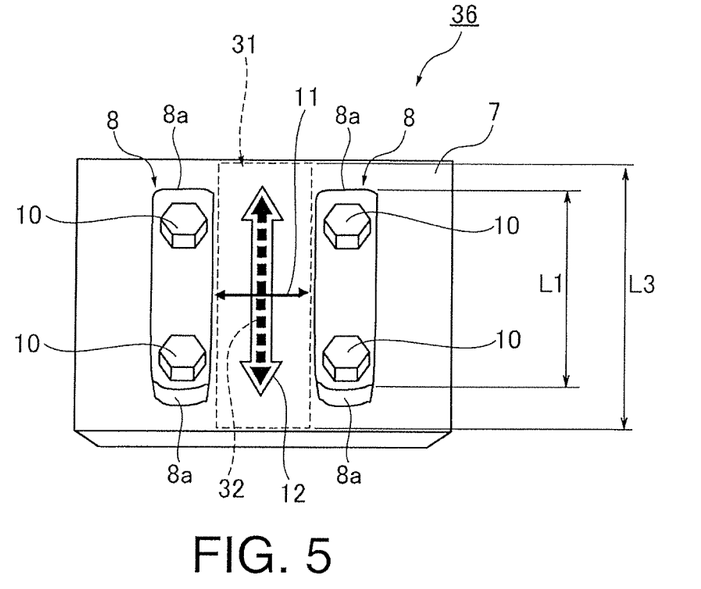
FIG. 5 is an enlarged, simplified top view of two of the terminals of the electrical component structure illustrated in FIGS. 1 and 2, with the electrical component structure being configured in accordance with a third embodiment.

FIG. 5 is an enlarged, simplified top view of a connection section 36 in accordance with a third embodiment, which can be incorporated in the motor 1 of FIG. 1. In other words, the connection section 36 represents two terminals of the connection section 6 illustrated in FIGS. 1 and 2, when the connection section 36 is incorporated in the motor 1 of FIG. 1. FIG. 5 will be used to explain details of an electrical component structure in accordance with the third embodiment. Parts that are identical or equivalent to parts of the previously described connection sections will be indicated with the same reference numerals in the connection section 36.

In the third embodiment, the connection section 36 includes the terminal block 7 and the metal terminals 8 (only two shown). The terminal block 7 is made of an insulating material. The metal terminals 8 are fastened to the terminal block 7 with the fastening members 10. The terminal block 7 serves as an insulator, while the metal terminals 8 serve as the conductive parts. The metal terminals 8 (only two shown) are arranged to be substantially parallel to each other such that the metal terminals 8 are separated by substantially equal intervals. A magnet 31 is embedded in the terminal block 7 between adjacent ones of the metal terminals 8. The magnet 31 constitutes an example of a magnetic flux generating structure of this embodiment.

As shown in FIG. 5, in a plan view, the magnet 31 is configured to have a rectangular shape substantially the same as the shape of the metal terminals 8. A length dimension L3 of the magnet 31 is longer than a length dimension L1 of the metal terminals 8, and the magnet 31 is arranged between the metal terminals 8 so as to be parallel to the metal terminals 8. The magnet 31 has a lengthwise magnetization direction 32.

As indicated with an arrow in FIG. 5, the magnet 31 of the third embodiment serves to generate a magnetic flux 12 with magnetic flux lines 12 between the metal terminals 8 and the magnetic flux lines 12 being oriented in a direction intersecting the electric line of force 11 existing between the metal terminals 8. The magnetic flux exerts a magnetic force that impedes the tendency of residual metal particles existing between the metal terminals 8 to align with the electric line of force 11.

Operational effects of an electrical component structure according to the third embodiment will now be explained.

In the electrical component structure according to the third embodiment, the magnet 31 embedded in the insulating material of the terminal block 7 generates a magnetic flux with magnetic flux lines 12 that intersect with the electric line of force 11 existing between the metal terminals 8, as indicated with the arrow in FIG. 5. As a result, a magnetic force produced by the magnetic flux serves to prevent residual metal particles existing between the metal terminals 8 from aligning with the electric line of force 11, thereby preventing a short circuit from occurring between the metal terminals 8.

Additionally, with the third embodiment, the magnetic flux exerting a magnetic force on metal particles adhering to the terminal block 7 can be reliably generated by merely providing the embedded magnet 31 between the metal terminals 8. In other words, it is not necessary to change an insulating material serving as a main substance from which the terminal block 7 is made. As a result, the manufacturing cost can be reduced in comparison with a design that requires changing the insulating material serving as the main substance from which the terminal block 7 is made.

Explanations of other constituent features and operational effects are omitted for brevity because they are identical or equivalent to constituent features and operational effects of the previously explained embodiments.

Figure 6:
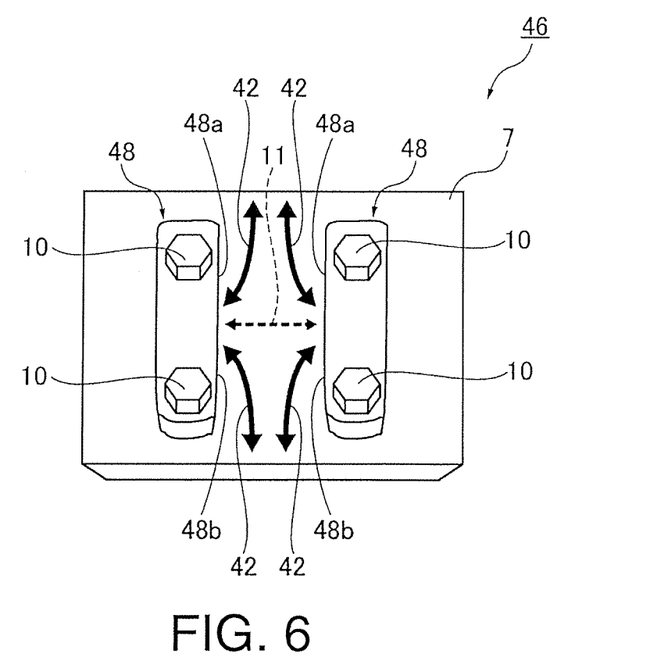
FIG. 6 is an enlarged, simplified top view of two of the terminals of the electrical component structure illustrated in FIGS. 1 and 2, with the electrical component structure being configured in accordance with a fourth embodiment.

FIG. 6 is an enlarged, simplified top view of a connection section 46 in accordance with a fourth embodiment, which can be incorporated in the motor 1 of FIG. 1. In other words, the connection section 46 represents two terminals of the connection section 6 illustrated in FIGS. 1 and 2, when the connection section 46 is incorporated in the motor 1 of FIG. 1. FIG. 6 will be used to explain details of an electrical component structure in accordance with the fourth embodiment. Parts that are identical or equivalent to parts of the previously described connection sections will be indicated with the same reference numerals in the connection section 46.

In the fourth embodiment, the connection section 46 includes the terminal block 7 and the metal terminals 48 (only two shown). The terminal block 7 is made of an insulating material. The metal terminals 48 are fastened to the terminal block 7 with the fastening members 10. The terminal block 7 serves as an insulator, while the metal terminals 48 serve as the conductive parts. The metal terminals 48 (only two shown) are arranged to be substantially parallel to each other such that the metal terminals 48 are separated by substantially equal intervals.

In this embodiment, the metal terminals 48 are magnetized to create a magnetic flux with magnetic flux lines 42 located between the adjacent ones of the metal terminals 48. In other words, the metal terminals 48 constitute an example of a magnetic flux generating structure of this embodiment. The metal terminals 48 are arranged adjacent to one another such that portions of adjacent metal terminals 48 that face each other have the same magnetic polarity. More specifically, the corresponding portions 48a of adjacent metal terminals 48 have the same magnetic polarity (e.g., S and S, or N and N), and the corresponding portions 48b of adjacent metal terminals 48 have the same magnetic polarity (e.g., N and N, or S and S). As a result, as shown in FIG. 6, a portion where a density of magnetic flux lines 42 is highest, and the magnetic flux lines 42 are strongest is arranged in a lengthwise middle portion where a density of electric lines of force 11 is also highest. Also the magnetic flux lines 42 are oriented to intersect with the electric lines of force.

Operational effects of an electrical component structure according to the fourth embodiment will now be explained.

In an electrical component structure according to the fourth embodiment, as shown in FIG. 6, the metal terminals 48 are magnetized such that portions of adjacent metal terminals 48 that face each other have the same magnetic polarity, i.e., such that the corresponding portions 48a of adjacent metal terminals 48 have the same magnetic polarity (e.g., S and S, or N and N) and the corresponding portions of adjacent metal terminals 48 have the same magnetic polarity (e.g., N and N, or S and S). Consequently, the magnetic flux lines 42 generated are oriented to intersect an electric line of force 11 existing between the metal terminals 48 at a lengthwise middle portion between the metal terminals 48 where a density of the electric lines of force 11 is highest and a static electric force acting on metal particles is largest. As a result, metal particles existing between the metal terminals 48 are prevented from aligning with the electric line of force 11 at a place where such alignment would otherwise occur most readily and the insulating performance of the connection section 46 can be improved efficiently.

Explanations of other constituent features and operational effects are omitted for brevity because they are identical or equivalent to constituent features and operational effects of the previously explained embodiments.

Figure 7:
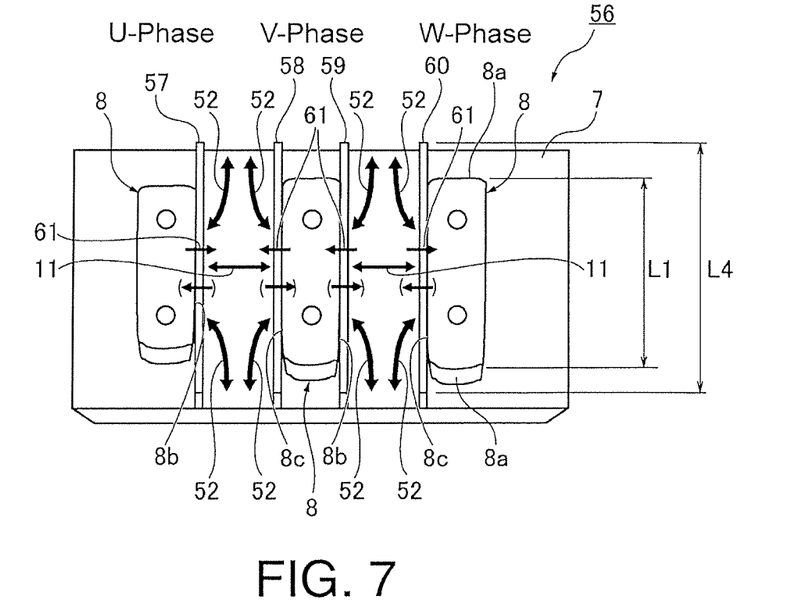
FIG. 7 is an enlarged, simplified top view of the terminals of the electrical component structure illustrated in FIGS. 1 and 2, with the electrical component structure being configured in accordance with a fifth embodiment.
Figure 8:
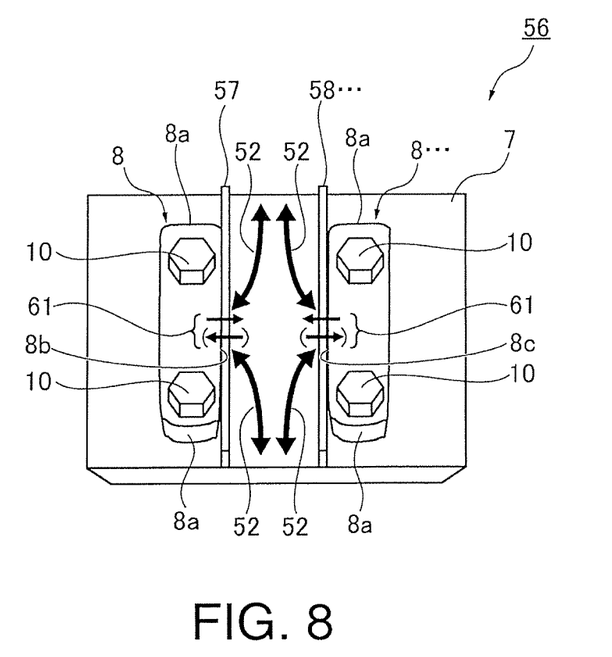
FIG. 8 is an enlarged simple plan view of two of the terminals of the electrical component structure according to the fifth embodiment.

FIGS. 7 and 8 are an enlarged, simplified top view of a connection section 56 in accordance with a fifth embodiment, which can be incorporated in the motor 1 of FIG. 1. In other words, the connection section 56 represents the terminals of the connection section 6 illustrated in FIGS. 1 and 2, when the connection section 56 is incorporated in the motor 1 of FIG. 1. FIGS. 7 and 8 will be used to explain details of an electrical component structure in accordance with the fifth embodiment. Parts that are identical or equivalent to parts of the previously described connection sections will be indicated with the same reference numerals in the connection section 56.

In the fifth embodiment, the connection section 56 includes the terminal block 7 and the metal terminals 8 that correspond to the three phases (U-phase, V-phase or W-phase). The terminal block 7 is made of an insulating material. The metal terminals 8 are fastened to the terminal block 7 with the fastening members 10. The terminal block 7 serves as an insulator, while the metal terminals 8 serve as the conductive parts. The metal terminals 8 (only two shown) are arranged to be substantially parallel to each other such that the metal terminals 8 are separated by substantially equal intervals. Permanent magnets 57 to 60 are attached to opposing side faces 8*b* and 8*c* of the adjacent ones of the metal terminals 8. The permanent magnets 57 to 60 are shaped like elongated plates and arranged such that opposing side faces 8*b* and 8*c* of adjacent metal terminals 8 have the same magnetic polarity. The metal terminals 8 with the permanent magnets 57 to 60 constitute an example of a magnetic flux generating structure of this embodiment. Thus, the permanent magnets 57 to 60 serve to magnetize the metal terminals 8 in magnetization directions 61 indicated with arrows in FIG. 7. In FIG. 7, the oppositely oriented arrows shown in parentheses indicate the magnetization directions that would result if the polarities of the permanent magnets 57 to 60 were reversed.

Operational effects of an electrical component structure according to the fifth embodiment will now be explained.

In addition to the operational effects obtained with the electrical component structure according to the fourth embodiment, the electrical component structure according to the fifth embodiment is constructed such that the metal terminals 8 are magnetized by the permanent magnets 57 to 60 such that opposing side faces 8*b* and 8*c* of adjacent metal terminals 8 have the same magnetic polarity (i.e., S and S, or N and N). As a result of the magnetization direction 61, the generated magnetic flux lines 52 intersect the electric line of force 11 existing between the metal terminals 8 at a lengthwise middle portion between the metal terminals 8 where a density of electric lines of force 11 is highest and a static electric force acting on metal particles is largest. Thus, the metal particles between the metal terminals 8 can be prevented from aligning with the electric line of force 11 at a place where a short circuit would otherwise occur most readily.

Also, since opposing side faces 8*b* and 8*c* of adjacent metal terminals 8 can be magnetized to have the same magnetic polarity by merely attaching elongated plate-like permanent magnets 57 to 60, the magnetic flux lines 52 can be generated reliably with a simple structure and the manufacturing cost can be suppressed.

Furthermore, when metal terminals 8 corresponding to three or more phases are arranged with substantially equal spacing in-between as shown in FIG. 7 and elongated plate-like permanent magnets 57 to 60 are attached to opposing side faces 8*b* and 8*c* of adjacent metal terminals 8 such that the opposing side faces 8*b* and 8*c* are magnetized to have the same magnetic polarity, an arrangement efficiency of the permanent magnets 57 to 60 can be improved by arranging the permanent magnets 57 to 60 such that the magnetization directions 61 are the same on both side faces 8*b* and 8*c* of a metal terminal 8 that is arranged between two other metal terminals 8. As a result, it is not necessary to increase the number of permanent magnets 57 to 60 or increase a magnetic field strength in order to obtain the desired insulating performance. This, too, enables the manufacturing cost to be suppressed.

As shown in FIG. 7, in the fifth embodiment, a length dimension L4 of the permanent magnets 57 to 60 is longer than the length dimension L1 of the metal terminals 8, and the permanent magnets 57 to 60 are disposed on the terminal block 7 between the metal terminals 8 such that the permanent magnets 57 to 60 are parallel to the metal terminals 8. thus, both longitudinal end portions of the permanent magnets 57 to 60 protrude beyond both longitudinal ends 8*a* of the metal terminals 8 in a lengthwise direction. Consequently, the magnetic forces of the magnetic flux lines 52 can be made to act on metal particles adhered to a surface of the terminal block 7 in a reliable fashion.

Explanations of other constituent features and operational effects are omitted for brevity because they are identical or equivalent to constituent features and operational effects of the previously explained embodiments.

Figure 9:
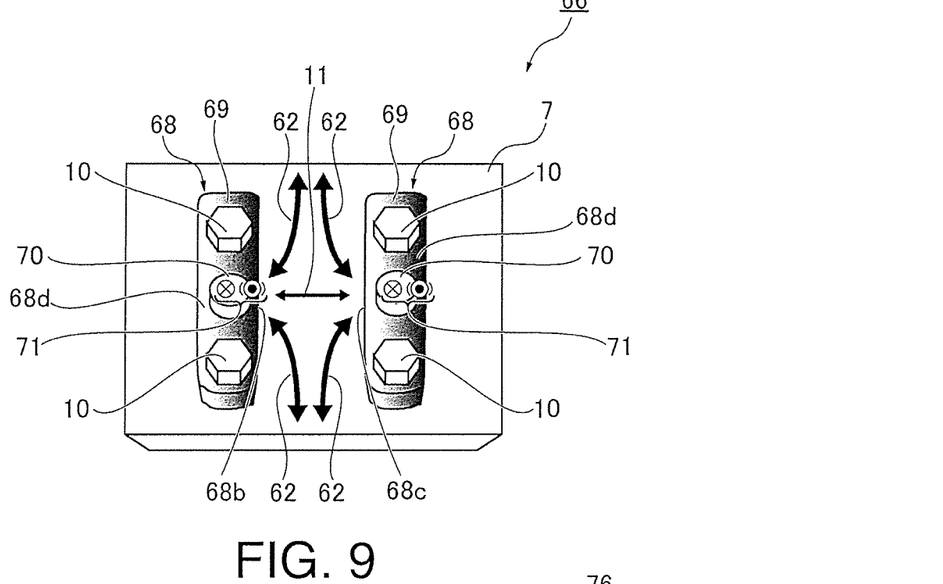
FIG. 9 is an enlarged, simplified top view of two of the terminals of the electrical component structure illustrated in FIGS. 1 and 2, with the electrical component structure being configured in accordance with to a sixth embodiment.

FIG. 9 is an enlarged, simplified top view of a connection section 66 in accordance with a sixth embodiment, which can be incorporated in the motor 1 of FIG. 1. In other words, the connection section 66 represents two terminals of the connection section 6 illustrated in FIGS. 1 and 2, when the connection section 66 is incorporated in the motor 1 of FIG. 1. FIG. 9 will be used to explain details of an electrical component structure in accordance with the sixth embodiment. Parts that are identical or equivalent to parts of the previously described connection sections will be indicated with the same reference numerals in the connection section 66.

In the sixth embodiment, the connection section 66 includes the terminal block 7 and a plurality of metal terminals 68 (only two shown). The terminal block 7 is made of an insulating material. The metal terminals 68 are fastened to the terminal block 7 with the fastening members 10. The terminal block 7 serves as an insulator, while the metal terminals 68 serve as the conductive parts. The metal terminals 68 (only two shown) are arranged to be substantially parallel to each other such that the metal terminals 68 are separated by substantially equal intervals.

The metal terminals 68 are provided with soft magnetic coatings 69 that are formed on substantially the entire surface of the metal terminals 68. Also a permanent magnet 70 is attached to an upper surface portion 68*d* of each of the metal terminals 68. The upper surface portion 68*d* is located in a lengthwise middle portion of each of the metal terminals 68. Each of the permanent magnets 70 is arranged such that it magnetizes with a magnetization direction 71 oriented either into or out of the terminal block 7 as indicated with an X mark or a circle in FIG. 9. The soft magnetic coatings 69 and the permanent magnets 70 constitute an example of a magnetic flux generating structure of this embodiment.

Operational effects of an electrical component structure according to the sixth embodiment will now be explained.

In addition to the operational effects obtained with the electrical component structure according to the fifth embodiment, the electrical component structure according to the sixth embodiment includes permanent magnets 70 arranged on the metal terminals 68 such that the resulting magnetization directions 71 are oriented vertically through the metal terminals 68. Since a soft magnetic coating 69 is applied to a surface of each of the metal terminals 68 in advance, the metal terminals 68 become magnetized readily and the generated magnetic flux lines 62 are oriented to intersect an electric line of force 11 existing between the metal terminals 68 at a lengthwise middle portion between the metal terminals 68 where a density of the electric lines of force 11 is highest and a static electric force acting on metal particles is largest. Thus, the metal particles between the metal terminals 68 can be prevented from being drawn into alignment with the electric line of force 11 at a place where a short circuit would otherwise occur most readily.

Additionally, regardless of the positions where the permanent magnets 70 are attached, the soft magnetic coatings 69 applied to substantially the entire upper surface of the metal terminals 68 serve to reliably magnetize the metal terminals 68 such that opposing side faces 68b and 68c of adjacent metal terminals 68 have the same magnetic polarity. Thus, magnetic flux lines 62 can be generated in a desired position. As a result, by merely attaching the permanent magnets 70 to any portion of the metal terminals 68, e.g., to an upper surface portion 68d located in a lengthwise middle portion of each of the metal terminals 68 as shown in FIG. 9, magnetic flux lines 62 serving to prevent the alignment of metal particles can be reliably generated from portions of adjacent metal terminals 68 facing opposite each other, i.e., from the opposing side faces 68b and 68c. Thus, the electric component structure according to the sixth embodiment can be obtained simply and easily without increasing a distance between the opposing side faces 68b and 68c of the metal terminals 68. Furthermore, the size of the electric component structure can be reduced.

Explanations of other constituent features and operational effects are omitted for brevity because they are identical or equivalent to constituent features and operational effects of the previously explained embodiments.

Figure 10:
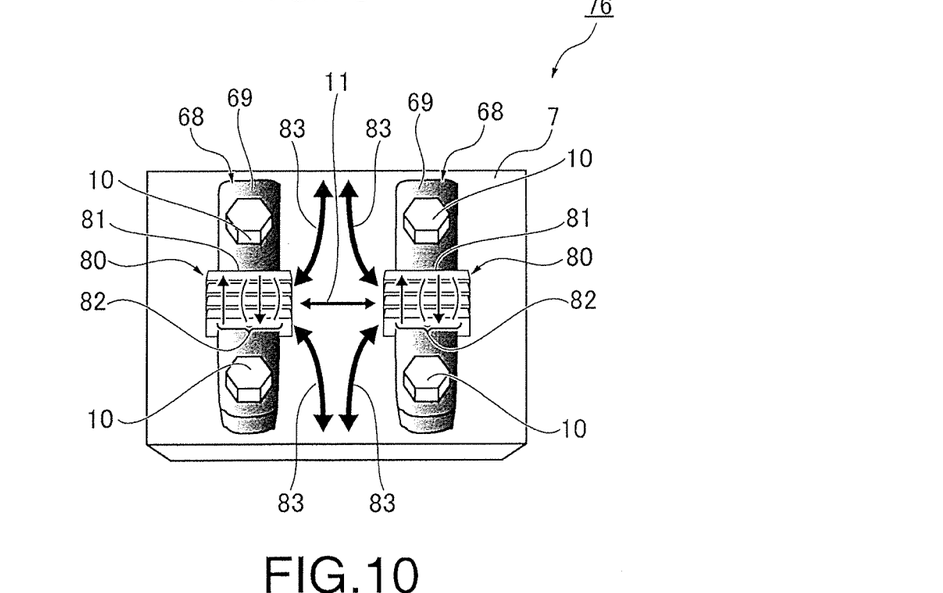
FIG. 10 is an enlarged, simplified top view of two of the terminals of the electrical component structure illustrated in FIGS. 1 and 2, with the electrical component structure being configured in accordance with a seventh embodiment.

FIG. 10 is an enlarged, simplified top view of a connection section 76 in accordance with a seventh embodiment, which can be incorporated in the motor 1 of FIG. 1. In other words, the connection section 76 represents two terminals of the connection section 6 illustrated in FIGS. 1 and 2, when the connection section 76 is incorporated in the motor 1 of FIG. 1. FIG. 10 will be used to explain details of an electrical component structure in accordance with the seventh embodiment. Parts that are identical or equivalent to parts of the previously described connection sections will be indicated with the same reference numerals in the connection section 76.

In the seventh embodiment, the connection section 76 includes the terminal block 7 and a plurality of metal terminals 68 (only two shown). The terminal block 7 is made of an insulating material. The metal terminals 68 are fastened to the terminal block 7 with the fastening members 10. The terminal block 7 serves as an insulator, while the metal terminals 68 serve as the conductive parts. The metal terminals 68 (only two shown) are arranged to be substantially parallel to each other such that the metal terminals 68 are separated by substantially equal intervals.

The electrical component structure according to the seventh embodiment is basically the same as the sixth embodiment, except that the permanent magnets 70 are replaced with electromagnets 80 for generating the magnetic flux lines 62. Soft magnetic coatings 69 are applied in advance to surfaces of the metal terminals 68 serving as conductive parts of the connection section 76 to magnetize the metal terminals 68. In the seventh embodiment, the soft magnetic coatings 69 are applied to substantially the entire upper surface of the metal terminals 68 and each of the electromagnets 80 is provided over the soft magnetic coating 69 on an upper surface portion 68d located in a lengthwise middle portion of the respective metal terminal 68. Each of the electromagnets 80 comprises a coil 81 wound around an outer peripheral surface of the metal terminal 68.

As shown in FIG. 10, the coils 81 can be configured such that when they are energized, the resulting magnetization directions 82 of the metal terminals 68 are oriented in the same lengthwise direction of the metal terminals 68. In FIG. 10, the oppositely oriented arrows shown in parentheses indicate the magnetization directions 82 that would result if the electric current flowed in the opposite direction in the coils 81.

Also, in the seventh embodiment, the coils 81 are electrically connected to the metal terminals 68 such that electric power used for generating the magnetic forces is supplied from the metal terminals 68.

Operational effects of an electrical component structure according to the seventh embodiment will now be explained.

In addition to the operational effects obtained with the previously explained embodiment and the first to sixth embodiments, the seventh embodiment is contrived such that when electric power is supplied to the metal terminals 68 of the connection section 76 to drive the motor 1, the coils 81 of the electromagnets 80 are energized because they are electrically connected to the metal terminals 68.

When the coils 81 are energized, magnetic forces are generated in the same direction with respect to each of the coils 81, i.e., in a longitudinal direction of the metal terminals 68. Thus, the magnetization directions 82 of the metal terminals 68 are the same.

Due to the soft magnetic coatings 69 applied to substantially the entire upper surfaces of the metal terminals 68, the metal terminals 68 are readily magnetized and magnetic fluxes 83 are generated between the metal terminals 68 in such directions as to obstruct an electric line of force 11 existing between the metal terminals 68.

The magnetic forces serve to prevent residual metal particles existing between the metal terminals 68 from aligning with the electric line of force 11, thereby preventing a short circuit from occurring and improving the ?power transfer through the metal terminals 68 to the motor 1.

In the seventh embodiment, the metal terminals 68 are magnetized by the electromagnets 80. Also, the coils 81 of the electromagnets 80 are electrically connected to the metal terminals 68 such that electric power used for generating the magnetic forces is supplied from the metal terminals 68. Consequently, it is not necessary to provide a separate electric power source to supply electric power to the coils 81 and the coils 81 need only be wound onto an outer surface of the metal terminals 68 such that an electrical connection is established. Thus, the seventh embodiment has a simple structure and can suppress manufacturing costs. It also uses space efficiently and does not cause the connection section 76 to be excessively large.

Explanations of other constituent features and operational effects are omitted for brevity because they are identical or equivalent to constituent features and operational effects of the previously explained embodiments.

Figure 11:
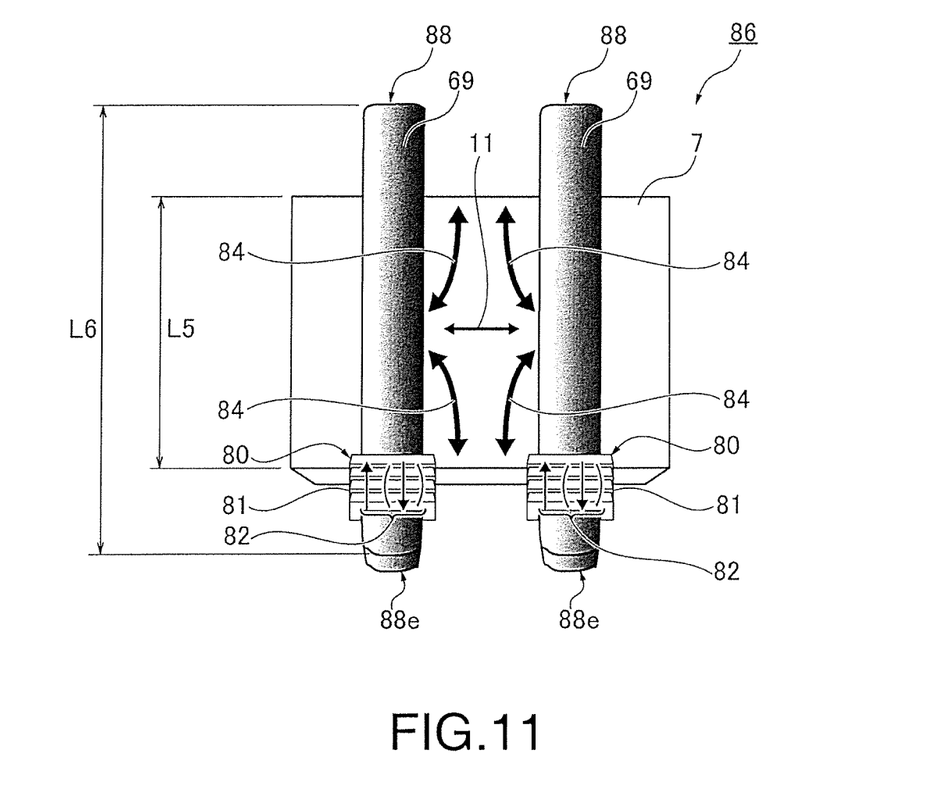
FIG. 11 is an enlarged, simplified top view of two of the terminals of the electrical component structure illustrated in FIGS. 1 and 2, with the electrical component structure being configured in accordance with an eighth embodiment.

FIG. 11 is an enlarged, simplified top view of a connection section 86 in accordance with an eighth embodiment, which can be incorporated in the motor 1 of FIG. 1. In other words, the connection section 86 represents two terminals of the connection section 6 illustrated in FIGS. 1 and 2, when the connection section 86 is incorporated in the motor 1 of FIG. 1. FIG. 11 will be used to explain details of an electrical component structure in accordance with the eighth embodiment. Parts that are identical or equivalent to parts of the previously described connection sections will be indicated with the same reference numerals in the connection section 86.

In the eighth embodiment, the connection section 86 includes the terminal block 7 and a plurality of metal terminals 88 (only two shown). The terminal block 7 is made of an insulating material. The metal terminals 88 are fastened to the terminal block 7 with the fastening members (not shown). The terminal block 7 serves as an insulator, while the metal terminals 88 serve as the conductive parts. The metal terminals 88 (only two shown) are arranged to be substantially parallel to each other such that the metal terminals 88 are separated by substantially equal intervals.

The electrical component structure according to the eighth embodiment is basically the same as the seventh embodiment, except that the coils 81 of the electromagnets 80 are wound onto the metal terminals 88 (which are coated in advance with soft magnetic coatings 69) at different positions than in the seventh embodiment. The coils 81 of the electromagnets 80 are wound onto end portions 88e of the metal terminals 88 that protrude from the terminal block 7.

In the electrical component structure according to the eighth embodiment, the connecting section 86 comprises a terminal block 7 and the metal terminals 88. A length dimension L6 of the metal terminals 88 is longer than an external dimension L5 of the terminal block 7, and the metal terminals 88 are affixed to the terminal block so as to be parallel to each other with a prescribed spacing in-between.

Similarly to the seventh embodiment, the coils 81 of the eighth embodiment are electrically connected to the metal terminals 88 such that electric power used for generating the magnetic forces is supplied from the metal terminals 88. The coils 81 are wound such that when they are energized, magnetic forces are generated in the same magnetization direction 82, which is a lengthwise direction of the metal terminals 88. In FIG. 11, the oppositely oriented arrows shown in parentheses indicate the magnetization directions 82 that would result if the electric current flowed in the opposite direction in the coils 81.

Operational effects of an electrical component structure according to the eighth embodiment will now be explained.

In addition to the operational effects obtained with an electrical component structure according to the previously explained embodiment and the first to seventh embodiments, an electrical component structure according to the eighth embodiment is contrived such that the metal terminals 88 protrude from the terminal block 7 and the coils 81 of the electromagnets 80 are wound near end portions 88e where the metal terminals 88 protrude beyond the terminal block 7. Magnetic forces are generated in the magnetization directions 82 shown in FIG. 11 when the coils 81 are energized.

Due to the soft magnetic coatings 69 applied to substantially the entire upper surfaces of the metal terminals 88, the metal terminals 88 are readily magnetized and magnetic flux lines 84 are generated between the metal terminals 88 in such directions as to obstruct the electric line of force 11 existing between the metal terminals 88. The magnetic forces serve to prevent residual metal particles existing between the metal terminals 88 from aligning with the electric line of force 11, thereby preventing a short circuit from occurring and improving the power transfer from the metal terminals to the motor.

In the eighth embodiment, even though the coils 81 of the electromagnets 80 are wound onto end portions 88e of the metal terminals 88 that protrude from the terminal block 7, magnetic forces oriented in the magnetization directions 82 shown in FIG. 11 are generated when the coils 81 are energized and the metal terminals 88 can be easily magnetized. Thus, regardless of the positions where the coils 81 of the electromagnets 80 are wound, the soft magnetic coatings 69 applied to substantially the entire upper surface of the metal terminals 88 serve to enable magnetic flux lines 84 to be reliably generated between the metal terminals 88 in directions oriented to intersect substantially perpendicularly with the electric line of force 11 at a lengthwise middle portion between the metal terminals 88, where a static electric force is largest and metal particles are most likely to become arranged in a path and cause a short circuit. As a result, an insulating performance of the connection section 86 can be improved and, since the coils 81 are wound near protruding end portions 88e such that the electromagnets 80 do not exist on the terminal block 7, it is not necessary to secure a mounting space for the electromagnets and the degree of freedom with respect to layout is increased.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them, unless otherwise indicated. The functions of one element can be performed by two, and vice versa. The structures and functions of one embodiment can be adopted in another embodiment. It is not necessary for all advantages to be present in a particular embodiment at the same time.

Also while the electrical component structures of the illustrated embodiments are used with the motor 1, the electrical component structures are not limited to such an application. The electrical component structures of the illustrated embodiments can be applied to any electrical component having at least two conductive parts held onto an insulator so long as a magnetic flux generating structure can be used to generate a magnetic flux between adjacent conductive parts and the magnetic flux lines being oriented in such a direction as to intersect or to intersect perpendicularly with the electric line of force existing between the conductive parts and to obstruct the electric line of force.

Various types of magnetic flux generating structure have been presented. The first embodiment presents the idea of the magnetized insulating member 13 embedded in the terminal block 7. The second embodiment presents the idea of mixing a plurality of magnetized particles into the insulation material forming the terminal block 17 in advance. The third embodiment presents the idea of the magnet 31 embedded into the terminal block 7. The fourth embodiment presents the idea of magnetizing the metal terminals 48 and 48 themselves. The fifth embodiment presents the idea of attaching elongated plate-like permanent magnets 57 to 60 to opposing side faces 8b and 8c of adjacent metal terminals 8 such that opposing side faces 8b and 8c have the same magnetic polarity. The sixth embodiment presents the idea of applying a soft magnetic coating 69 to substantially the entire surface of each of the metal terminals 68 and attaching the permanent magnet 70 to the upper surface portion 68d located in a lengthwise middle portion of each of the metal terminals 68. The seventh and eighth embodiments present the idea of attaching the electromagnet 80 to different portions of the metal terminals 68 instead of the permanent magnet 70. However, the present invention is not limited to these configurations. For example, it is acceptable to attach a plurality of permanent magnets or electromagnets to a single metal terminal. It is acceptable to embed magnetic bodies in all or only a portion of the terminal block 7. It is also acceptable to combine one or a plurality of permanent magnets and electromagnets. In short, there are no particular limitations on the shape, number, materials, or combinations of the parts constituting the magnetic flux generating structure. Basically, any kind of magnetic flux generating structure is acceptable so long as it generates magnetic flux lines between adjacent conductive parts (e.g., metal terminals 8) such that the electric line of force existing between adjacent conductive parts is obstructed.

Although the permanent magnets 70 of the sixth embodiment and the electromagnets 80 of the seventh and eighth embodiments are attached over the soft magnetic coatings 69 applied to substantially the entire surface of the metal terminals 68, the present invention is not limited to surface treatment. For example, it is acceptable for the metal terminals 68 to be made of a substance that is easily magnetized. It is also acceptable for the soft magnetic coating 69 to be applied to only a portion of the metal terminal 68 or for another surface treatment other than the soft magnetic coating 69 to be applied to the entire surface or a portion of the surface of the metal terminal 68. It is also acceptable to not to apply the soft magnetic coating 69 or any other surface treatment at all.

Additionally, in the seventh and eighth embodiments, electromagnets 80 are electrically connected to the metal terminals 68 such that electric power used for generating the magnetic forces is supplied from the metal terminals 68. However, the invention is not limited to such an arrangement and it is obviously acceptable to use an external power supply to provide electric power for generating magnetic flux.

Thus, the foregoing descriptions of the embodiments according to the present invention are provided for illustration only, and not for the purpose of limiting the invention as defined by the appended claims and their equivalents.

What is claimed is:

1. An electric component structure comprising:
   at least two electrical conductive parts arranged with an electric line of force existing between adjacent ones of the conductive parts;
   an insulator holding the conductive parts; and
   a magnetic flux generating structure formed by portions of the adjacent ones of the conductive parts that face each other and are magnetized with the same magnetic polarity, the magnetic flux generating structure being configured to generate a magnetic flux with magnetic flux lines oriented in a direction different from a direction of the electric line of force existing between the adjacent ones of the conductive parts.

2. The electrical component structure according to claim 1, wherein
   the magnetic flux generating structure is located between the adjacent ones of the conductive parts.

3. The electrical component structure according to claim 1, wherein
   the magnetic flux generating structure generates the magnetic flux with the magnetic flux lines perpendicularly intersecting the electric line of force.

4. The electrical component structure according to claim 1, wherein
   the magnetic flux generating structure includes a magnetized insulating member to generate the magnetic flux.

5. The electrical component structure according to claim 1, wherein
   the magnetic flux generating structure includes a plurality of magnetic particles forming a magnetic body molded within an insulating material of the insulator.

6. The electrical component structure according to claim 1, wherein
   the magnetic flux generating structure includes a magnet embedded in an insulating material of the insulator.

7. The electrical component structure according to claim 1, wherein
   the conductive parts are magnetized with permanent magnets.

8. The electrical component structure according to claim 7, wherein
   the permanent magnets are attached to the adjacent ones of the conductive parts that face each other.

9. The electrical component structure according to claim 7, wherein
   the permanent magnets are attached to a soft magnetic coating of the conductive parts.

10. The electrical component structure according to claim 1, wherein
    the conductive parts are magnetized using electromagnets.

11. The electrical component structure according to claim 10, wherein
    each of the electromagnets includes a coil wound onto one of the conductive parts, and the conductive parts have been pretreated with a soft magnetic coating.

12. The electrical component structure according to claim 10, wherein
    the electromagnets are electrically connected to the conductive parts and electric power for generating a magnetic force is supplied from the conductive parts.

13. The electrical component structure according to claim 11, wherein
    the electromagnets are electrically connected to the conductive parts and electric power for generating a magnetic force is supplied from the conductive parts.

14. The electrical component structure according to claim 8, wherein
    the permanent magnets are attached to a soft magnetic coating of the conductive parts.

15. The electrical component structure according to claim 2, wherein
    the magnetic flux generating structure generates the magnetic flux with the magnetic flux lines perpendicularly intersecting the electric line of force.

16. The electrical component structure according to claim 2, wherein
    the magnetic flux generating structure includes a magnetized insulating member to generate the magnetic flux.

17. The electrical component structure according to claim 2, wherein
    the magnetic flux generating structure includes a plurality of magnetic particles forming a magnetic body molded within an insulating material of the insulator.

18. The electrical component structure according to claim 2, wherein
the magnetic flux generating structure includes a magnet embedded in an insulating material of the insulator.

* * * * *